Dec. 17, 1935.  B. L. MALLORY  2,024,464
LUBRICATING MEANS FOR SHOCK ABSORBERS
Filed Dec. 7, 1933

INVENTOR.
Bonnie L. Mallory
BY Hull, Brock et al
ATTORNEY.

Patented Dec. 17, 1935

2,024,464

UNITED STATES PATENT OFFICE 2,024,464

LUBRICATING MEANS FOR SHOCK ABSORBERS

Bonnie L. Mallory, Cleveland Heights, Ohio, assignor to The Cleveland Shock Absorber Company, Cleveland, Ohio, a corporation of Ohio Application December 7, 1933, Serial No. 701,356

3 Claims. (Cl. 308—95)

This invention relates to bearing lubrication for a shock absorber.

The principal object of the invention is to provide simple and efficient means for lubricating the journal bearings of a friction type shock absorber while preventing leakage of the lubricant into the friction mechanism and to the outside of the housing.

A more limited object is to provide a novel and efficient seal in combination with a lubricant reservoir whereby the journal bearings may be lubricated while the lubricant is effectively sealed against leakage into the braking mechanism.

A still further object is to provide for convenience in assembly and to provide for the attainment of the foregoing objects by the use of a minimum number of parts.

Figure 1:
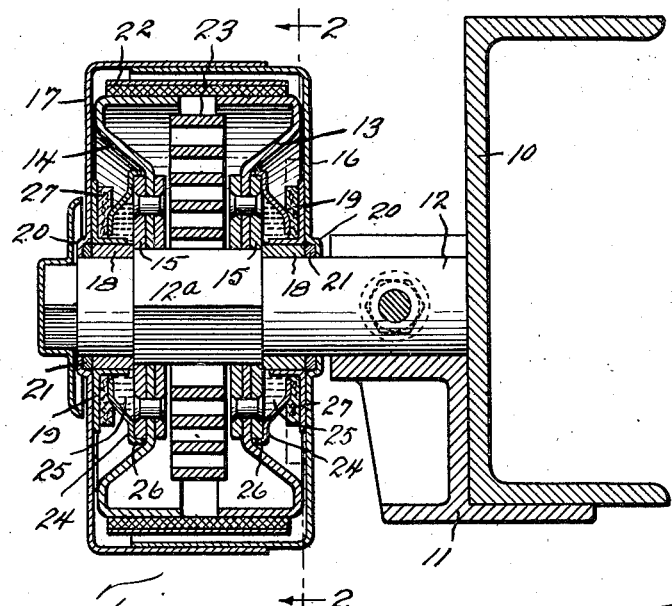
Figure 4:
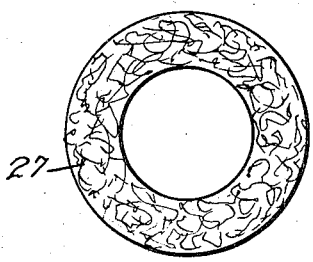
Figure 2:
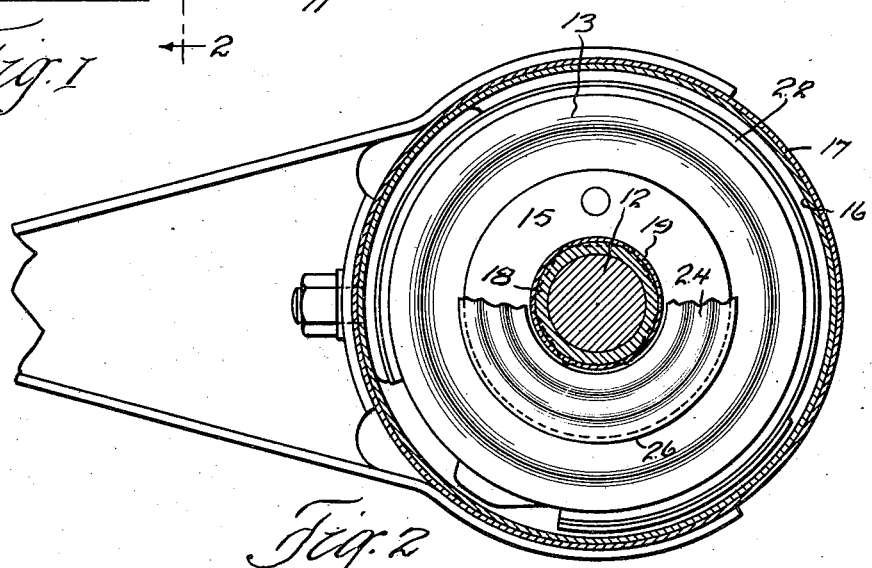
Figure 3:
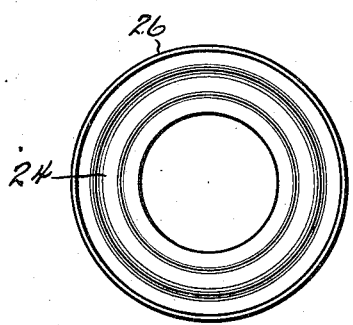

Other and more limited objects will become apparent from the following description when taken in connection with the accompanying drawing in which Fig. 1 is an axial section through a shock absorber embodying my invention; Fig. 2 is a fragmentary sectional view corresponding substantially to the line 2—2 of Fig. 1; Fig. 3 is a detail of a cupped lubricant reservoir member and Fig. 4 is a detail of a deformable packing washer used in conjunction therewith.

In the drawing, numeral 10 indicates the frame member of a vehicle. Attached to such frame member is a mounting bracket 11 to which is adjustably and fixedly secured a shaft 12. Secured to a polygonal portion 12a of the shaft 12 are a pair of drum members 13 and 14, each provided with reinforcing plates 15 on each side thereof. The reinforcing plates and drum members are tightly press fitted on the shaft portion 12a sufficiently closely to prevent the passage of the lubricant therebetween.

Journaled upon the shaft 12 on cylindrical portions adjacent the portion 12a are housing members 16 and 17, each provided with a bronze bushing 18 secured in place by annular angle members 19 closely press fitted upon said bushing members 18. The main housing member is offset as indicated at 20 to provide a space for reception of a packing washer 21.

Surrounding the drum members 13 and 14 is a friction band 22 connected with one or both of the housing members 16 and 17 and through a spring 23 with the shaft portion 12a. This friction band is designed to work upon dry drum surfaces and to this end all lubricant must be excluded from the interior of the housing.

It is necessary that the journals by which the housing is mounted upon the shaft 12 should be lubricated and to this end I provide a cupped annular member 24, one for each housing member adapted to snap over or be otherwise secured over the outer reinforcing plates 15 and to define therewith a lubrication chamber 25. These plates may be secured in sealing engagement with the drum members in any suitable manner but I prefer to provide a peripheral flange 26 which can be snapped over the edge of the reinforcing plates 15 and pried off therefrom if necessary. The cupped members 24 terminate adjacent the angle members 19 of the housing but in spaced relation to both walls thereof. Interposed between the restricted inner portions of the members 24 and the adjacent housing wall are deformable packing washers 27 which may be of any suitable packing material, preferably felt. It is intended that the members 24 shall be in fixed relation to the drum members and that the packing washers 27 will move with the housing members and therefore slide over the restricted inner surfaces of such members 24, these members being of restricted area for the purpose of minimizing the friction wear at this point.

In assembling, the members 24 are filled with nonflowing lubricant and placed in position over the reinforcing plates 15, the packing washers 27 are placed over the inwardly projecting bearings of the housing members and the housing members are then placed in position over the drums. The lubricant is sealed from escape between the members 24 and the reinforcing plates 15 and also from the passage between the polygonal shaft portion 12a and the drum members. The packing washer 27 prevents escape between the housing and the member 24, thus leaving the only possible lubricant flow between the bushing members 18 and the shaft 12. Even this flow is limited by the packing washers 21.

It has been found in practice that this construction results in proper lubrication of the housing bearings over a long period of time, probably for the normal life of the unit.

From the foregoing, it will be seen that I have provided a device well adapted for its intended purposes and while I have shown and described the preferred embodiment, I wish it understood that I am limited only in accordance with the scope of the appended claims and the prior art.

Having thus described my invention, what I claim is:

1. In a device of the class described, a shaft, a drum member fixed thereto, a housing member journaled thereon and spaced from said drum member, said housing member including a bushing working on said shaft and extending to a point adjacent said drum member, a cupped annular member engaging said drum member having its inner portion extending substantially perpendicularly to said shaft and defining between itself and the same a lubricant chamber, and a deformable packing disk interposed between said inner portion of said annular member and said housing for preventing the escape of lubricant.

2. In a device of the class described, a shaft, a pair of drum members fixed thereto in spaced relation, a pair of housing members journaled on said shaft enclosing and spaced from said drum members, each housing member including a bushing working on said shaft and extending therealong to a point adjacent a drum member, a cupped annular member engaging each drum member having its inner portion extending substantially perpendicularly to said shaft and defining therewith a lubricant chamber, and a deformable packing disk interposed between the inner portion of each annular member and a housing member for preventing the escape of lubricant.

3. In a device of the class described, a shaft, a drum member fixed thereon, an annular reinforcing plate secured to said drum member, a housing member journaled on said shaft and spaced from said drum member, said housing member including a bushing working on said shaft and extending to a point adjacent said drum member, a cupped annular member having a peripheral flange engaging over and contacting the outer edge of said reinforcing plate having its inner portion extending substantially perpendicularly to said shaft and defining therewith a lubricant chamber, and a deformable packing disk interposed between said inner portion of said annular member and said housing for preventing the escape of lubricant.

BONNIE L. MALLORY.